US012734991B2

(12) United States Patent
Johansson et al.

(10) Patent No.: US 12,734,991 B2
(45) Date of Patent: Sep. 15, 2026

(54) METHOD FOR ACTIVATING A VEHICLE ALARM SYSTEM FOR LIGHTING UP A TARGET VEHICLE, VEHICLE ALARM SYSTEM AND VEHICLE COMPRISING AN ALARM SYSTEM

(71) Applicants: Ningbo Geely Automobile Research & Development Co., Ltd., Ningbo (CN); Zhejiang Geely Holding Group Co., Ltd., Zhejiang (CN)

(72) Inventors: Jonathan Johansson, Gothenburg (SE); Erik Lindberg Nilsson, Gothenburg (SE)

(73) Assignees: Ningbo Geely Automobile Research & Dev. Co., Ltd., Ningbo (CN); Zhejiang Geely Holding Group Co., Ltd., Zhejiang (CN)

( * ) Notice: Subject to any disclaimer, the term of this patent is extended or adjusted under 35 U.S.C. 154(b) by 0 days.

(21) Appl. No.: 19/218,257

(22) Filed: May 24, 2025

(65) Prior Publication Data

US 2025/0282323 A1 Sep. 11, 2025

Related U.S. Application Data

(63) Continuation of application No. PCT/CN2023/132945, filed on Nov. 21, 2023.

(30) Foreign Application Priority Data

Nov. 29, 2022 (EP) .................................... 22210204

(51) Int. Cl.
*B60R 25/104* (2013.01)
*B60R 25/30* (2013.01)
(Continued)

(52) U.S. Cl.
CPC ............ *B60R 25/104* (2013.01); *B60R 25/30* (2013.01); *H04W 4/46* (2018.02); *B60R 2025/1013* (2013.01)

(58) Field of Classification Search
CPC .................. B60R 25/104; B60R 25/30; B60R 2025/1013; H04W 4/46; H04W 12/121;
(Continued)

(56) References Cited

U.S. PATENT DOCUMENTS 10,461,421 B1 10/2019 Tran et al.
10,696,272 B2 * 6/2020 Salter .................... B60Q 1/143
(Continued)

FOREIGN PATENT DOCUMENTS

CN 111002945 A 4/2020
DE 102013001307 B4 6/2018
(Continued)

OTHER PUBLICATIONS

International Search Report from corresponding International Application No. PCT/CN2023/132945, mailed on Feb. 29, 2024, 3 pages.

*Primary Examiner* — Eric Blount
(74) *Attorney, Agent, or Firm* — Tucker Ellis LLP

(57) ABSTRACT

A vehicle alarm system includes an alarm signal detection unit configured for detecting an alarm signal of a target vehicle. An alarm signal of the target vehicle is detected by means of the alarm signal detection unit upon activation of an intruder alarm of the target vehicle. An angular direction of the vehicle in relation to the target vehicle and a distance between the vehicle and the target vehicle are determined upon detection of the alarm signal. A light source of the vehicle is activated to light up the target vehicle and/or a light source of a device associated with the vehicle is activated to light up the target vehicle when the determined angular direction is within a predetermined angular direction
(Continued)

range and the determined distance is within a predetermined distance range.

18 Claims, 5 Drawing Sheets

(51) Int. Cl.
*H04W 4/46* (2018.01)
*B60R 25/10* (2013.01)

(58) Field of Classification Search
CPC . H04W 12/126; B60Q 2300/47; B60Q 1/085; B60Q 1/24
USPC ..................................................... 340/426.23
See application file for complete search history.

(56) References Cited

U.S. PATENT DOCUMENTS

| | | | | |
|---|---|---|---|---|
| 11,002,827 | B2 * | 5/2021 | Blanco | G08B 13/19647 |
| 11,021,133 | B2 * | 6/2021 | Lu | H04N 7/188 |
| 11,104,302 | B2 * | 8/2021 | Björkengren | G08B 13/19647 |
| 11,518,345 | B2 * | 12/2022 | Kim | B60R 25/305 |
| 2018/0218582 | A1 * | 8/2018 | Hodge | H04N 21/44004 |
| 2019/0283709 | A1 * | 9/2019 | Lu | H04N 7/183 |
| 2019/0308587 | A1 | 10/2019 | Salter et al. | |
| 2021/0103738 | A1 | 4/2021 | Buerkle et al. | |
| 2022/0041131 | A1 * | 2/2022 | Lee | B60R 25/102 |

FOREIGN PATENT DOCUMENTS

| | | | | |
|---|---|---|---|---|
| JP | 2024068461 A | * | 5/2024 | B60R 16/023 |
| WO | 2017155448 A1 | | 9/2017 | |

* cited by examiner

METHOD FOR ACTIVATING A VEHICLE ALARM SYSTEM FOR LIGHTING UP A TARGET VEHICLE, VEHICLE ALARM SYSTEM AND VEHICLE COMPRISING AN ALARM SYSTEM

RELATED APPLICATION DATA

This application is a continuation of International Patent Application No. PCT/CN2023/132945, filed Nov. 21, 2023, and claims the benefit of European Patent Application No. 22210204.8, filed Nov. 29, 2022, the disclosures of which are incorporated herein by reference in their entireties.

TECHNICAL FIELD

The present disclosure relates to a method for activating a vehicle alarm system for lighting up a target vehicle. The vehicle alarm system comprises an alarm signal detection unit, where the alarm signal detection unit is configured for detecting an alarm signal of the target vehicle. The disclosure further relates to a vehicle alarm system for lighting up a target vehicle and a vehicle comprising a vehicle alarm system for lighting up a target vehicle.

BACKGROUND

Alarm systems are commonly used in vehicle applications, where vehicles are equipped with an intruder alarm. The intruder alarm is emitting an alarm signal when an intruder is triggering one or more sensors of the intruder alarm. The sensors of the intruder alarm may for example be shock sensors, door sensors, pressure sensors, motion detection sensors, tilt sensors, glass-break sensors, or other suitable sensors used in the intruder alarm system. When a sensor is triggered, the intruder alarm system is emitting the alarm signal, which for example may be an audible signal, a visible signal and/or a communication signal. Most intruder alarms for vehicle are using flashing light alarm signals and horn alarm signals when the intruder alarm is triggered, but other communication signals may be used.

In dark conditions, such as during night, an intruder may however operate without being seen despite the alarm signal triggered.

There is thus a need for an improved vehicle alarm system, where the intruder may be more easily detected.

SUMMARY

An object of the present disclosure is to provide a method for activating a vehicle alarm system for lighting up a target vehicle, a vehicle alarm system for lighting up a target vehicle, and a vehicle comprising a vehicle alarm system for lighting up a target vehicle, where the previously mentioned problems are avoided.

The disclosure concerns a method for activating a vehicle alarm system arranged in a vehicle for lighting up a target vehicle. The vehicle alarm system comprises an alarm signal detection unit, where the alarm signal detection unit is configured for detecting an alarm signal of the target vehicle. The method comprises the steps: detecting an alarm signal of the target vehicle by means of the alarm signal detection unit upon activation of an intruder alarm of the target vehicle; determining an angular direction of the vehicle in relation to the target vehicle and a distance between the vehicle and the target vehicle upon detection of the alarm signal; activating a light source of the vehicle to light up the target vehicle and/or activating a light source of a device associated with the vehicle to light up the target vehicle, when the determined angular direction is within a predetermined angular direction range and the determined distance is within a predetermined distance range.

Advantages with these features are that in dark conditions, such as during night, it will be more difficult for an intruder to operate without being seen, and thus the intruder is more easily detected. With the vehicle alarm system, the target vehicle is efficiently lit up by the vehicle when the alarm signal of the target vehicle is detected by the alarm signal detection unit of the vehicle. The light source can be used for scaring an intruder triggering the intruder alarm of the target vehicle.

In one embodiment, the alarm signal is a sound signal emitted by the target vehicle upon activation of the intruder alarm. The method further comprises the step: detecting the emitted sound signal by means of the alarm signal detection unit. The alarm signal detection unit suitably comprises a microphone sensor to detect the sound signal emitted by the target vehicle.

In one embodiment, the alarm signal is a light signal emitted by the target vehicle upon activation of the intruder alarm. The method further comprises the step: detecting the emitted light signal by means of the alarm signal detection unit. The alarm signal detection unit suitably comprises a camera sensor to detect the light signal emitted by the target vehicle.

In one embodiment, the alarm signal is a V2V communication signal emitted by the target vehicle upon activation of the intruder alarm. The method further comprises the step: detecting the emitted V2V communication signal by means of the alarm signal detection unit. The alarm signal detection unit suitably comprises a V2V signal sensor to detect the V2V communication signal emitted by the target vehicle.

In one embodiment, the method further comprises the step: actively directing the light source of the vehicle towards the target vehicle and/or actively directing the light source of the device to light up the target vehicle. The vehicle may be equipped with a movably arranged light source that could be directed in different positions. Suitably, the light source of the vehicle is arranged as active or adaptive headlights, and used for changing direction of the light source. In this way, the light source is directed towards the target vehicle for higher light intensity. The light source of the device may be actively directed towards the target vehicle to light up the target vehicle. The light source of the device may be movably arranged relative to the device, or the device may per se change position for actively directing the light source. By using the light source of the device, the target vehicle may be efficiently lit up by the device in situations where the light from the headlights of the vehicle will not reach the target vehicle.

In one embodiment, the vehicle alarm system further comprises a distance and direction determination unit arranged in the vehicle. The method further comprises the step: determining the angular direction and the distance to the target vehicle by means of the distance and direction determination unit. The distance and direction determination unit may be arranged as a suitable control unit. The angular direction of the vehicle in relation to the target vehicle may be measured and estimated between different parts of the vehicle and the target vehicle depending on the configurations of the vehicle alarm system and the distance and direction determination unit. The distance between the vehicle and the target vehicle may be measured and estimated between different parts of the vehicle and the target vehicle depending on the configurations of the vehicle alarm system and the distance and direction determination unit.

In one embodiment, the vehicle alarm system further comprises a light determination unit arranged in the vehicle, where the light determination unit is configured for determining how the target vehicle is lit up by the light source. The method further comprises the step: determining the difference between light reflected by the target vehicle before and after activation of the light source by means of the light determination unit. The light determination unit may be arranged as a camera unit in the vehicle. Image detection and analysing software is suitably used for determining the difference in reflected light. When the vehicle has activated the light source, the light determination unit may use picture frame-to-frame comparison to compare if the light source has significantly changed how the target vehicle is lit up by the light source. The light determination unit may in this way secure that the target vehicle is sufficiently lit up by the light source. If the vehicle alarm system is arranged in more than one vehicle in the same area, the light determination unit can be used for controlling the number of light sources of different vehicles that need to be activated, or determine if the target vehicle is positioned underneath a streetlight.

The disclosure further concerns a vehicle alarm system arranged in a vehicle for lighting up a target vehicle. The vehicle alarm system comprises an alarm signal detection unit, where upon activation of an intruder alarm of the target vehicle the alarm signal detection unit is configured for detecting an alarm signal of the target vehicle. The vehicle alarm system is configured for determining an angular direction of the vehicle in relation to the target vehicle and a distance between the vehicle and the target vehicle upon detection of the alarm signal. When the determined angular direction is within a predetermined angular direction range and the determined distance is within a predetermined distance range, the vehicle is configured for activating a light source to light up the target vehicle and/or the vehicle is configured for activating a light source of a device associated with the vehicle to light up the target vehicle.

Advantages with the vehicle alarm system are that in dark conditions, such as during night, it will be more difficult for an intruder to operate without being seen, and thus the intruder is more easily detected. The target vehicle is efficiently lit up by the vehicle when the alarm signal of the target vehicle is detected by the alarm signal detection unit of the vehicle. The light source can be used for scaring an intruder triggering the intruder alarm of the target vehicle.

In one embodiment, the alarm signal is a sound signal emitted by the target vehicle upon activation of the intruder alarm. The alarm signal detection unit is configured for detecting the emitted sound signal. The alarm signal detection unit suitably comprises a microphone sensor to detect the sound signal emitted by the target vehicle.

In one embodiment, the alarm signal is a light signal emitted by the target vehicle upon activation of the intruder alarm. The alarm signal detection unit is configured for detecting the emitted light signal. The alarm signal detection unit suitably comprises a camera sensor to detect the light signal emitted by the target vehicle.

In one embodiment, the alarm signal is a V2V communication signal emitted by the target vehicle upon activation of the intruder alarm. The alarm signal detection unit is configured for detecting the emitted V2V communication signal. The alarm signal detection unit suitably comprises a V2V signal sensor to detect the V2V communication signal emitted by the target vehicle.

In one embodiment, the vehicle alarm system is configured for actively directing the light source of the vehicle and/or the light source of the device towards the target vehicle upon receipt of the alarm signal. The vehicle may be equipped with a movably arranged light source that could be directed in different positions. Suitable, the light source is arranged as active or adaptive headlights, and used for changing direction of the light source. In this way, the light source is directed towards the target vehicle for higher light intensity. The light source of the device may be actively directed towards the target vehicle to light up the target vehicle. The light source of the device may be movably arranged or the device may per se change position for actively directing the light source. By using the light source of the device, the target vehicle may be efficiently lit up by the device in situations where the light from the headlights of the vehicle will not reach the target vehicle.

In one embodiment, the light source is a headlight of the vehicle, and/or the light source is a light unit of the device associated with the vehicle.

In one embodiment, the vehicle alarm system further comprises a distance and direction determination unit arranged in the vehicle. The distance and direction determination unit is configured for determining the angular direction and the distance to the target vehicle. The distance and direction determination unit may be arranged as a suitable control unit. The angular direction of the vehicle in relation to the target vehicle may be measured and estimated between different parts of the vehicle and the target vehicle depending on the configurations of the vehicle alarm system and the distance and direction determination unit. The distance between the vehicle and the target vehicle may be measured and estimated between different parts of the vehicle and the target vehicle depending on the configurations of the vehicle alarm system and the distance and direction determination unit.

In one embodiment, the vehicle alarm system further comprises a light determination unit arranged in the vehicle, where the light determination unit is configured for determining how the target vehicle is lit up by the light source. The light determination unit is configured for determining the difference between light reflected by the target vehicle before and after activation of the light source. The light determination unit may be arranged as a camera unit in the vehicle. Image detection and analysing software is suitably used for determining the difference in reflected light. When the vehicle has activated the light source, the light determination unit may use picture frame-to-frame comparison to compare if the light source has significantly changed how the target vehicle is lit up by the light source.

In one embodiment, the distance and direction determination unit is arranged as a camera unit, a microphone unit, and/or a V2V unit in the vehicle; and/or the light determination unit is arranged as a camera unit in the vehicle.

The light determination unit may be arranged as a camera unit in the vehicle. Image detection and analysing software is suitably used for determining the difference in reflected light. When the vehicle has activated the light source, the light determination unit may use picture frame-to-frame comparison to compare if the light source has significantly changed how the target vehicle is lit up by the light source.

In one embodiment, the vehicle alarm system is arranged in two or more vehicles, where the two or more vehicles are configured for communicating with each other for activating at least one light source of the two or more vehicles to light up the target vehicle and/or activating at least one light source of at least one device associated the two or more vehicles to light up the target vehicle. In this way, the vehicle alarm system is made more efficient by the involvement of more than one vehicle only. The vehicles may be arranged to communicate with each other via suitable communication means, and each of the vehicles comprises alarm system components for an efficient system setup.

The disclosure further concerns a vehicle comprising the vehicle alarm system described above.

BRIEF DESCRIPTION OF THE DRAWINGS

The disclosure will be described in detail in the following, with reference to the attached drawings, in which.

DETAILED DESCRIPTION OF EXAMPLE EMBODIMENTS

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Figure 1A:
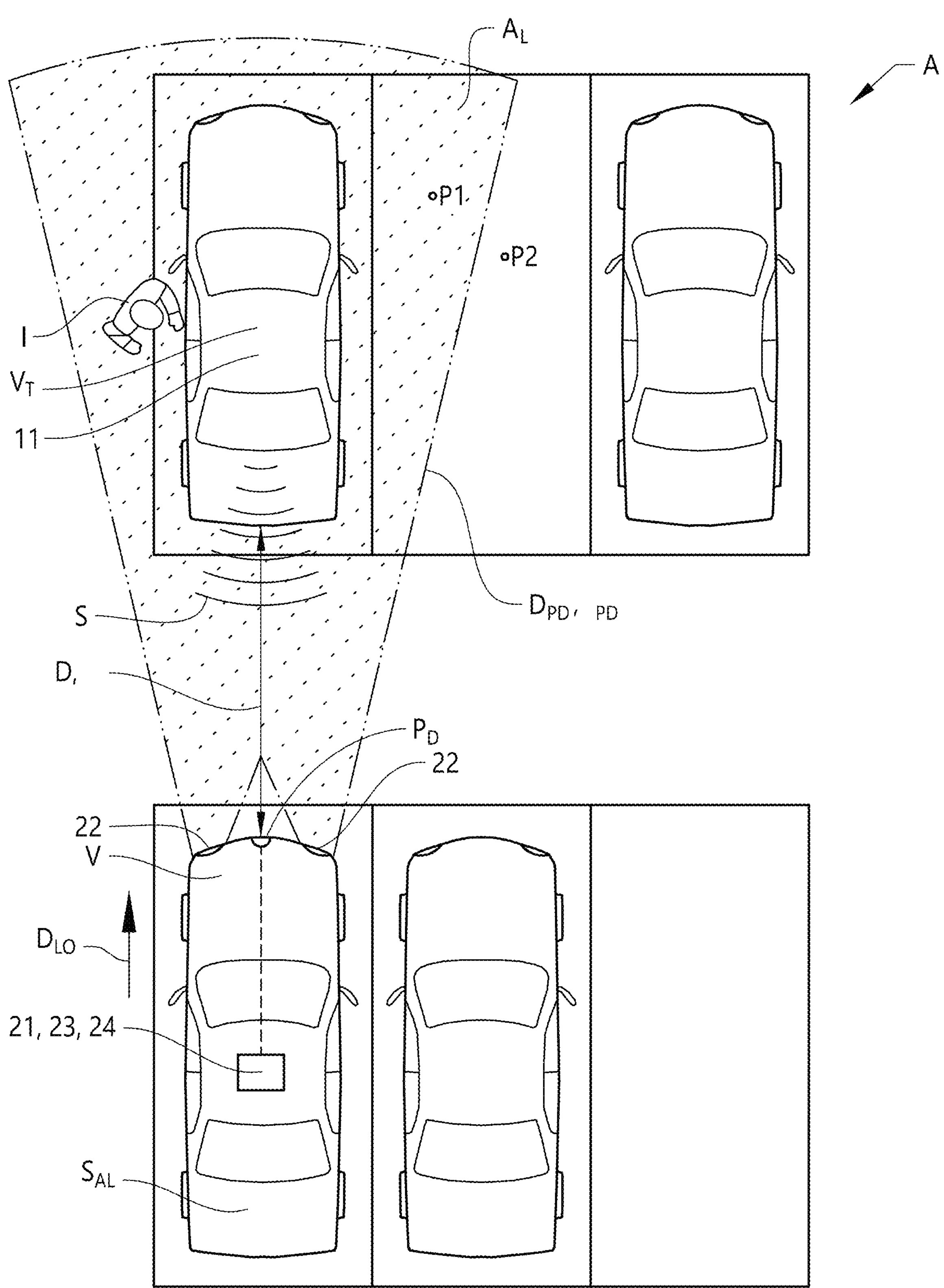
FIGS. 1A-1C show schematically, in views from above, different operational situations of a vehicle comprising a vehicle alarm system for lighting up a target vehicle, and a device associated with the vehicle to light up the target vehicle.
Figure 1B:
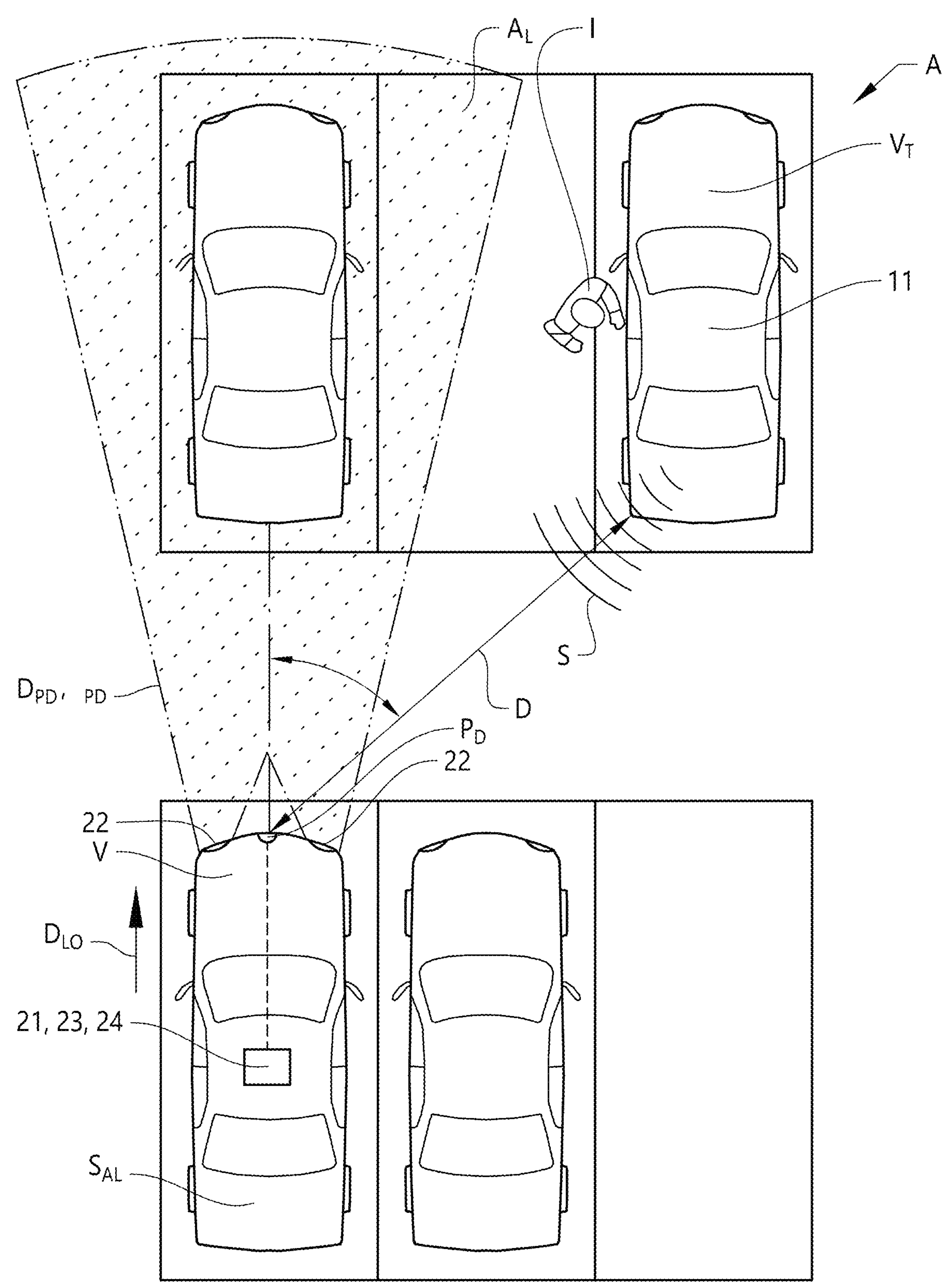
Figure 1C:
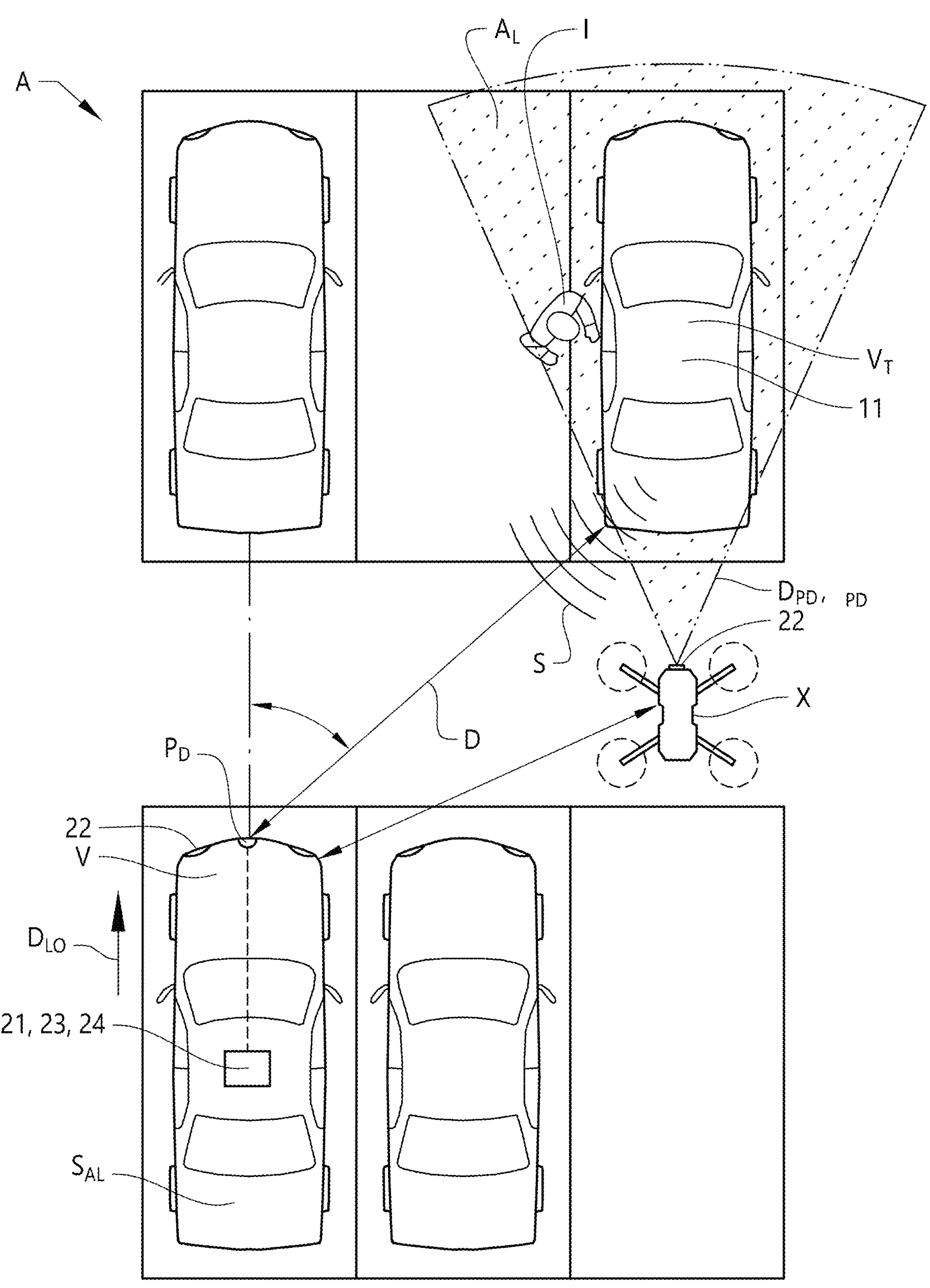

FIGS. 1A-1C schematically show in different embodiments a vehicle V parked in an area A. The area A may for example be a defined parking area, such as a parking lot or a car park, a parking garage, a street area, or other suitable area for parking two or more vehicles.

The vehicle V comprises a vehicle alarm system $S_{AL}$, and the vehicle alarm system $S_{AL}$ is arranged for lighting up a target vehicle $V_T$, upon detection of an alarm signal S of an intruder alarm 11 of the target vehicle $V_T$. The target vehicle $V_T$ is thus equipped with an intruder alarm 11, where the intruder alarm 11 of the target vehicle $V_T$ is configured for emitting an alarm signal S when an intruder I is triggering one or more sensors of the intruder alarm 11. The sensors of the intruder alarm 11 may for example be shock sensors, door sensors, pressure sensors, motion detection sensors, tilt sensors, glass-break sensors, or other suitable sensors used in vehicle intruder alarm systems. When a sensor is triggered, the intruder alarm 11 is emitting the alarm signal S, which for example may be an audible signal, a visible signal and/or a communication signal. Most intruder alarms 11 for vehicle are using flashing light alarm signals and horn alarm signals when the intruder alarm 11 is triggered, but other communication signals such as a transferred V2V intruder alarm signal or a V2X intruder alarm signal may be used. A V2V intruder alarm signal may be sent from the target vehicle $V_T$ and detected directly by the vehicle alarm system $S_{AL}$ of the vehicle V. A V2X intruder alarm signal may be sent from the target vehicle $V_T$ and transferred to a remote source, and thereafter the remote source may transfer a signal to an area where that target vehicle is located for detection by the vehicle alarm system $S_{AL}$ of the vehicle V. The remote source may for example be a service centre, a node, and/or a repeater. The V2V signal or V2X signal may be transferred as a wireless communication signal, for example through a mobile communication network, a Wi-Fi network, or a Bluetooth network.

The vehicle alarm system $S_{AL}$ comprises an alarm signal detection unit 21. The alarm signal detection unit 21 is arranged in the vehicle V and configured for detecting an alarm signal S of the target vehicle $V_T$ upon activation of the intruder alarm 11 of the target vehicle $V_T$. The alarm signal detection unit 21 arranged in the vehicle V is in this way detecting the alarm signal S emitted from the target vehicle $V_T$. The alarm signal detection unit 21 is equipped with suitable sensors or other detection means for detecting the alarm signal S, such as sensors or detecting units configured for detecting an audible signal, a visible signal and/or a communication signal. The sensors or detecting units of the alarm signal detection unit 21 may thus be arranged for detecting flashing light alarm signals, horn alarm signals, V2V alarm signals and/or V2X alarm signals.

In one example embodiment, the alarm signal S is a sound signal emitted by the target vehicle $V_T$ upon activation of the intruder alarm 11, and the alarm signal detection unit 21 is configured for detecting the emitted sound signal. In this embodiment, the alarm signal detection unit 21 suitably comprises a microphone sensor to detect the sound signal emitted by the target vehicle $V_T$.

In one example embodiment, the alarm signal S is a light signal emitted by the target vehicle $V_T$ upon activation of the intruder alarm 11, and the alarm signal detection unit 21 is configured for detecting the emitted light signal. In this embodiment, the alarm signal detection unit 21 suitably comprises a camera sensor to detect the light signal emitted by the target vehicle $V_T$.

In one example embodiment, the alarm signal S is a V2V communication signal emitted by the target vehicle $V_T$ upon activation of the intruder alarm 11, and the alarm signal detection unit 21 is configured for detecting the emitted V2V communication signal. In this embodiment, the alarm signal detection unit 21 suitably comprises a V2V signal sensor to detect the V2V communication signal emitted by the target vehicle $V_T$.

The vehicle alarm system $S_{AL}$ is configured for determining an angular direction $\alpha$ of the vehicle V in relation to the target vehicle $V_T$ and a distance D between the vehicle V and the target vehicle $V_T$ upon detection of the alarm signal S. The angular direction $\alpha$ is suitably determined as a measured angular direction between a longitudinal direction $D_{LO}$ of the vehicle V and the position of the target vehicle $V_T$, as understood from for example FIGS. 1A-1B. The distance D is suitably determined as a measured distance from the vehicle V to the target vehicle $V_T$, as indicated with the arrow in for example FIGS. 1A-1B.

The vehicle alarm system $S_{AL}$ further comprises a distance and direction determination unit 23 arranged in the vehicle V. The distance and direction determination unit 23 may be arranged as a suitable control unit, and the distance and direction determination unit 23 is configured for determining the angular direction $\alpha$ and the distance D to the target vehicle $V_T$.

The angular direction $\alpha$ of the vehicle V in relation to the target vehicle $V_T$ may be measured and estimated between different parts of the vehicle V and the target vehicle $V_T$ depending on the configurations of the vehicle alarm system $S_{AL}$ and the distance and direction determination unit 23. Therefore, the angular direction $\alpha$ may be presented as an angular range. The distance D between the vehicle V and the target vehicle $V_T$ may be measured and estimated between different parts of the vehicle V and the target vehicle $V_T$ depending on the configurations of the vehicle alarm system $S_{AL}$ and the distance and direction determination unit 23. Therefore, the distance D may be presented as a distance range.

The distance and direction determination unit 23 of the vehicle alarm system $S_{AL}$ may determine and calculate the distance D and the angular direction α from a determined point $P_D$ in the vehicle V to a part of the target vehicle $V_T$ positioned closest to the vehicle V, as indicated in the figures. The determined point $P_D$ may for example be any suitable point in the vehicle V where one or more sensors forming part of the distance and direction determination unit 23, and used for determining the distance D and the angular direction α, are located in the vehicle V.

The distance and direction determination unit 23 may for example be arranged as a camera unit, a microphone unit, and/or a V2V unit in the vehicle V. The distance and direction determination unit 23, may for example use triangulation technologies and/or image detecting and analysing technologies for determining the angular direction α and the distance D to the target vehicle $V_T$. The sensors used for determining the distance D and the angular direction α may for example be one or more of camera sensors, microphone sensors, ultrasonic sensors, radar sensors, LIDAR sensors, laser sensors and/or signal receiving sensor units. The type of sensor or sensors used may be depending on the alarm signal S emitted from the target vehicle $V_T$, the configuration of the distance and direction determination unit 23, and the position of the target vehicle $V_T$ relative to the vehicle V.

Upon detection of the alarm signal S and determination that the determined angular direction α is within a predetermined angular direction range $\alpha_{PD}$ and the determined distance D is within a predetermined distance range $D_{DP}$, a light source 22 of the vehicle V is activated to light up the target vehicle $V_T$ and/or a light source 22 of a device X associated with the vehicle V is activated to light up the target vehicle $V_T$, as will be further described below. The vehicle V and/or the device X associated with the vehicle V has a light-up area $A_L$ determined by the light source 22, and the light-up area $A_L$ is determined as an area possible to be lit-up by the light source 22. The light-up area is dependent on the configuration of the light source 22 and may vary between different vehicles and devices, depending on the design, construction, and positioning of the light source 22. The light source 22 may use any suitable type of light to light up the target vehicle $V_T$, such as for example visible light or near infrared light.

The predetermined angular direction range $\alpha_{PD}$ and the predetermined distance range $D_{DP}$ are correlated to the light-up area $A_L$. The light-up area $A_L$ of the vehicle V is determining possible predetermined angular direction ranges $\alpha_{PD}$ and predetermined distance ranges $D_{DP}$ depending on the position of the target vehicle $V_T$ in relation to the vehicle V. As an example, a first point P1 in FIG. 1A is arranged within the light-up area $A_L$ of the vehicle V, and the first point P1 is possible to be lit up by the light source 22 of the vehicle V. A second point P2 in FIG. 1A is arranged outside the light-up area $A_L$ of the vehicle V, and the second point P2 is thus not possible to be lit up by the light source 22 of the vehicle V.

The distance and direction determination unit 23 suitably comprises one or more sensors located in the determined point $P_D$ of the vehicle V, as described above. Suitably, the predetermined angular direction range $\alpha_{PD}$ and the predetermined distance range $D_{DP}$ are set as distance and direction threshold values where the vehicle V and/or the device X associated with the vehicle V efficiently can light up the target vehicle $V_T$.

Depending on the configuration and design of the light sources 22, the light-up area $A_L$ may be a three-dimensional light body having complex geometrical shapes in three dimensions, and the predetermined distance range $D_{DP}$ may vary depending on the angular direction α between the vehicle V, or the device associated with the vehicle V, and the target vehicle $V_T$. The predetermined angular direction ranges $\alpha_{PD}$ and predetermined distance ranges $D_{DP}$ of the vehicle alarm system $S_{AL}$, are therefore suitably calibrated relative to each other for the specific light source 22 used in the vehicle V and/or the device X associated with the vehicle V. The vehicle alarm system $S_{AL}$ is with this configuration suitably determining the distance D and the angular direction α from the determined point $P_D$ in the vehicle V to a part of the target vehicle $V_T$ positioned closest to the vehicle V. When the distance and direction determination unit 23 arranged in the vehicle V is determining the angular direction α in relation to the target vehicle $V_T$ and the distance D to the target vehicle $V_T$, and when the determined angular direction α is within the predetermined angular direction range $\alpha_{PD}$ and the determined distance D is within the predetermined distance range $D_{DP}$, the vehicle V and/or the device X associated with the vehicle V is activating the light source 22 to light up the target vehicle $V_T$.

The vehicle alarm system $S_{AL}$ is thus only activating the light source 22 upon detection of the alarm signal S when the determined angular direction α is within the predetermined angular direction range $\alpha_{PD}$ and the determined distance D is within the predetermined distance range $D_{DP}$. If the determined angular direction α is outside the predetermined angular direction range $\alpha_{PD}$, the light source 22 is not activated upon detection of the alarm signal S emitted from the target vehicle $V_T$. If the determined distance D is outside the predetermined distance range $D_{DP}$, the light source 22 is not activated upon detection of the alarm signal S emitted from the target vehicle $V_T$.

In FIG. 1A, an exemplified operational situation of the vehicle alarm system $S_{AL}$ is schematically illustrated. A vehicle V and a target vehicle $V_T$ are parked in an area A, and the target vehicle $V_T$ is parked in a direction straight ahead of the vehicle V, as understood from the figure.

In the example embodiment shown in FIG. 1A, a distance and direction determination unit 23 of the vehicle alarm system $S_{AL}$ is determining the distance D and the angular direction α from a determined point $P_D$ arranged at a mid-front-end of the vehicle V to a part of the target vehicle $V_T$ positioned closest to the vehicle V, as indicated in the figure. In the illustrated embodiment, the distance D and the angular direction α are measured from the mid-front-end of the vehicle V to a rear end of the target vehicle $V_T$ in a direction parallel to the longitudinal direction $D_{LO}$ of the vehicle V upon detection of the alarm signal S emitted from the target vehicle $V_T$. As described above, the target vehicle $V_T$ is parked in a direction straight ahead of the vehicle V and with the positions shown in FIG. 1A, the angular direction α between the longitudinal direction $D_{LO}$ of the vehicle V and the position of the target vehicle $V_T$ is zero degrees. Thus, the angular direction α is the same as the longitudinal direction $D_{LO}$ of the vehicle V.

The vehicle V comprises a light source 22, and in the embodiment illustrated in FIG. 1A, the light source 22 is arranged as two headlights of the vehicle V. The vehicle V has a light-up area $A_L$ determined by the light source 22, and the light-up area $A_L$ is as explained above determined as an area possible to be lit-up by the light source 22. The light-up area is dependent on the configuration of the light source 22 and may vary between different vehicles, depending on the design, construction, and positioning of the light source 22.

When an intruder I is triggering one or more sensors of the intruder alarm 11 of the target vehicle $V_T$, the intruder alarm 11 of the target vehicle $V_T$ is activated and an alarm signal S is emitted, as indicated in FIG. 1A. When the emitted alarm signal S of the target vehicle $V_T$ is detected by means of the alarm signal detection unit 21 of the vehicle V, upon activation of the intruder alarm 11 of the target vehicle $V_T$, the angular direction $\alpha$ of the vehicle V in relation to the target vehicle $V_T$ and the distance D between the vehicle V and the target vehicle $V_T$ is determined by means of the distance and direction determination unit 23 arranged in the vehicle V. When it is determined that the angular direction $\alpha$ is within the predetermined angular direction range $\alpha_{PD}$ and the distance D is within the predetermined distance range $D_{DP}$, the vehicle V is activating the light source 22 to light up the target vehicle $V_T$. The target vehicle $V_T$ is in this way efficiently lit up by the vehicle V when the alarm signal S of the target vehicle $V_T$ is detected by the alarm signal detection unit 21 of the vehicle V, and the light source 22 can thus be used for scaring the intruder I that was triggering the intruder alarm 11 of the target vehicle $V_T$.

The predetermined angular direction range $\alpha_{PD}$ and the predetermined distance range $D_{DP}$ are correlated to the light-up area $A_L$. The light-up area $A_L$ of the vehicle V is determining possible predetermined angular direction ranges $\alpha_{PD}$ and predetermined distance ranges $D_{DP}$ depending on the position of the target vehicle $V_T$ in relation to the vehicle V. As understood from FIG. 1A, the target vehicle $V_T$ is arranged within the light-up area $A_L$ of the vehicle V, and the target vehicle $V_T$ is possible to be lit up by the light source 22 of the vehicle V.

The distance and direction determination unit 23 comprises one or more sensors located in the determined point $P_D$ of the vehicle V. In the embodiment shown in FIG. 1A, the predetermined angular direction range $\alpha_{PD}$ and the predetermined distance range $D_{DP}$ are set as distance and direction threshold values where the vehicle V efficiently can light up the target vehicle $V_T$. Depending on the configuration and design of the light sources, the light-up area 22 may be a three-dimensional light body having complex geometrical shapes in three dimensions, and the predetermined distance range $D_{DP}$ may vary depending on the angular direction $\alpha$ between the vehicle V and the target vehicle $V_T$. The predetermined angular direction ranges $\alpha_{PD}$ and the predetermined distance ranges $D_{DP}$ of the vehicle alarm system $S_{AL}$, are calibrated relative to each other for the light source 22 used in the vehicle V. The vehicle alarm system $S_{AL}$ is determining the distance D and the angular direction $\alpha$ from the determined point $P_D$ in the vehicle V to a part of the target vehicle $V_T$ positioned closest to the vehicle V, as indicated with the arrow in FIG. 1A. In the illustrated embodiment in FIG. 1A, the target vehicle $V_T$ is positioned within possible ranges for the predetermined angular direction $\alpha_{PD}$ and the predetermined distance $D_{DP}$, and the target vehicle $V_T$ can be efficiently lit up by the vehicle V. Thus, when the distance and direction determination unit 23 arranged in the vehicle V is determining the angular direction $\alpha$ in relation to the target vehicle $V_T$ and the distance D to the target vehicle $V_T$, and when the determined angular direction $\alpha$ is within the predetermined angular direction range $\alpha_{PD}$ and the determined distance D is within the predetermined distance range $D_{DP}$, the vehicle V is activating the light source 22 to efficiently light up the target vehicle $V_T$.

The vehicle alarm system $S_{AL}$ of the embodiment shown in FIG. 1A is only activating the light source 22 upon detection of the alarm signal S when the determined angular direction $\alpha$ is within the predetermined angular direction range $\alpha_{PD}$ and the determined distance D is within the predetermined distance range $D_{DP}$. If the determined angular direction $\alpha$ is outside the predetermined angular direction range $\alpha_{PD}$, the light source 22 is not activated upon detection of the alarm signal S emitted from the target vehicle $V_T$. If the determined distance D is outside the predetermined distance range $D_{DP}$, the light source 22 is not activated upon detection of the alarm signal S emitted from the target vehicle $V_T$.

In FIG. 1B, another exemplified operational situation of the vehicle alarm system $S_{AL}$ is schematically illustrated. A vehicle V and a target vehicle $V_T$ are parked in an area A. In this embodiment, the target vehicle $V_T$ is parked ahead of and in a direction to the right from the vehicle V. The target vehicle $V_T$ is parked at an angular direction $\alpha$ non-parallel to the longitudinal direction $D_{LO}$ of the vehicle V and the angular direction $\alpha$ is thus not the same as the longitudinal direction $D_{LO}$ of the vehicle V.

In the example embodiment shown in FIG. 1B, a distance and direction determination unit 23 of the vehicle alarm system $S_{AL}$ is determining the distance D and the angular direction $\alpha$ from a determined point $P_D$ arranged at a mid-front-end of the vehicle V to a part of the target vehicle $V_T$ positioned closest to the vehicle V, as indicated in the figure. The distance D and the angular direction $\alpha$ are with the positions shown in FIG. 1B, measured from a mid-front-end of the vehicle V to a rear left corner of the target vehicle $V_T$ upon detection of the alarm signal S emitted from the target vehicle $V_T$.

The vehicle V comprises a light source 22, and in the embodiment illustrated in FIG. 1B, the light source 22 is arranged as two headlights of the vehicle V. The vehicle V has a light-up area $A_L$ determined by the light source 22, and the light-up area $A_L$ is as explained above determined as an area possible to be lit-up by the light source 22.

The light source 22 of the vehicle shown in FIG. 1B has a light-up area $A_L$. The light-up area $A_L$ of the vehicle V is determining possible predetermined angular direction ranges $\alpha_{PD}$ and predetermined distance ranges $D_{DP}$ depending on the position of the target vehicle $V_T$ in relation to the vehicle V. The predetermined angular direction range $\alpha_{PD}$ and the predetermined distance range $D_{DP}$ are correlated to the light-up area $A_L$. As understood from FIG. 1B, the target vehicle $V_T$ is arranged outside the light-up area $A_L$ of the vehicle V, and the target vehicle $V_T$ is not possible to be lit up by the light source 22 of the vehicle V.

When an intruder I is triggering one or more sensors of the intruder alarm 11 of the target vehicle $V_T$, the intruder alarm 11 of the target vehicle $V_T$ is activated and an alarm signal S is emitted, as indicated in FIG. 1B. When the emitted alarm signal S of the target vehicle $V_T$ is detected by means of the alarm signal detection unit 21 of the vehicle V, upon activation of the intruder alarm 11 of the target vehicle $V_T$, the angular direction $\alpha$ of the vehicle V in relation to the target vehicle $V_T$ and the distance D between the vehicle V and the target vehicle $V_T$ is determined by means of the distance and direction determination unit 23 arranged in the vehicle V. In the embodiment shown in FIG. 1B, it is determined that the angular direction $\alpha$ is outside the predetermined angular direction range $\alpha_{PD}$ and consequently the distance D is outside the predetermined distance range $D_{DP}$. The vehicle V is therefore not activating the light source 22 to light up the target vehicle $V_T$.

The distance and direction determination unit 23 comprises one or more sensors located in the determined point $P_D$ of the vehicle V. In the embodiment shown in FIG. 1B, the predetermined angular direction range $\alpha_{PD}$ and the predetermined distance range $D_{DP}$ are set as distance and direction threshold values where the vehicle V efficiently can light up the target vehicle $V_T$. Depending on the configuration and design of the light sources, the light-up area 22 may be a three-dimensional light body having complex geometrical shapes in three dimensions, and the predetermined distance range $D_{DP}$ may vary depending on the angular direction $\alpha$ between the vehicle V and the target vehicle $V_T$. The predetermined angular direction ranges $\alpha_{PD}$ and the predetermined distance ranges $D_{DP}$ of the vehicle alarm system $S_{AL}$, are calibrated relative to each other for the light source 22 used in the vehicle V. The vehicle alarm system $S_{AL}$ is determining the distance D and the angular direction $\alpha$ from the determined point $P_D$ in the vehicle V to a part of the target vehicle $V_T$ positioned closest to the vehicle V, as indicated with the arrow in FIG. 1B. In the illustrated embodiment in FIG. 1B, the target vehicle $V_T$ is positioned outside possible ranges for the predetermined angular direction $\alpha_{PD}$ and/or the predetermined distance $D_{DP}$, and the target vehicle $V_T$ cannot be lit up by the vehicle V. The vehicle V is therefore not activating the light source 22.

The vehicle alarm system $S_{AL}$ of the embodiment shown in FIG. 1B is only activating the light source 22 upon detection of the alarm signal S when the determined angular direction $\alpha$ is within the predetermined angular direction range $\alpha_{PD}$ and the determined distance D is within the predetermined distance range $D_{DP}$. Since the determined angular direction $\alpha$ is outside the predetermined angular direction range $\alpha_{PD}$, the light source 22 is not activated upon detection of the alarm signal S emitted from the target vehicle $V_T$.

In FIG. 1C, a further exemplified operational situation of the vehicle alarm system $S_{AL}$ is schematically illustrated. A vehicle V and a target vehicle $V_T$ are parked in an area A. In this embodiment, the target vehicle $V_T$ is parked ahead of and in a direction to the right from the vehicle V. The target vehicle $V_T$ is parked at an angular direction $\alpha$ non-parallel to the longitudinal direction $D_{LO}$ of the vehicle V and the angular direction $\alpha$ is thus not the same as the longitudinal direction $D_{LO}$ of the vehicle V.

In the embodiment shown in FIG. 1C, the vehicle V is equipped with a device X associated with the vehicle V. In this case, the device X is arranged as a remotely controlled drone or an unmanned aerial vehicle (UAV) that is operatively connected to the vehicle V. The device X is controlled and operated by the vehicle V through suitable wireless communication protocols. Suitably, the vehicle V is arranged with a non-illustrated docking area or landing area for the device X. It should be understood that the device X in other embodiments could be arranged as a remotely controlled ground vehicle associated with the vehicle V, or other suitable remotely controlled vehicle associated with the vehicle V.

In the example embodiment shown in FIG. 1C, a distance and direction determination unit 23 of the vehicle alarm system $S_{AL}$ is determining the distance D and the angular direction $\alpha$ from a determined point $P_D$ arranged at a mid-front-end of the vehicle V to a part of the target vehicle $V_T$ positioned closest to the vehicle V, as indicated in the figure. The distance D and the angular direction $\alpha$ are with the positions shown in FIG. 1C, measured from a mid-front-end of the vehicle V to a rear left corner of the target vehicle $V_T$ upon detection of the alarm signal S emitted from the target vehicle $V_T$.

The vehicle V and the device X each comprises a light source 22. In the embodiment illustrated in FIG. 1C, the light source 22 of the vehicle V is arranged as two headlights of the vehicle V. The vehicle V has a light-up area $A_L$ determined by the light source 22, and the light-up area $A_L$ is as explained above determined as an area possible to be lit-up by the light source 22. The light up area of the vehicle V in the embodiment shown in FIG. 1C is exemplified to be the same as in FIG. 1B. In the embodiment illustrated in FIG. 1C, the light source 22 of the device X is arranged as a light unit arranged in or connected to the device X. The device V has a light-up area $A_L$ determined by the light source 22, as schematically shown in FIG. 1C, and the light-up area $A_L$ of the device X is determined as an area possible to be lit-up by the light source 22 of the device X. It should be understood that the light-up area $A_L$ of the device X is determined by the operational range of the device X relative to the vehicle V to which the device X is associated.

When an intruder I is triggering one or more sensors of the intruder alarm 11 of the target vehicle $V_T$, the intruder alarm 11 of the target vehicle $V_T$ is activated and an alarm signal S is emitted, as indicated in FIG. 1C. When the emitted alarm signal S of the target vehicle $V_T$ is detected by means of the alarm signal detection unit 21 of the vehicle V, upon activation of the intruder alarm 11 of the target vehicle $V_T$, the angular direction $\alpha$ of the vehicle V in relation to the target vehicle $V_T$ and the distance D between the vehicle V and the target vehicle $V_T$ is determined by means of the distance and direction determination unit 23 arranged in the vehicle V.

In the embodiment shown in FIG. 1C, the target vehicle $V_T$ is positioned outside the light-up area $A_L$ of the vehicle V in the same way as described above in connection to FIG. 1B. The vehicle V is therefore not activating the light source 22 to light up the target vehicle $V_T$ upon detection of the alarm signal S emitted from the target vehicle $V_T$.

However, in the embodiment shown in FIG. 1C, the target vehicle $V_T$ is positioned within the light-up area $A_L$ of the device X. The device X may therefore activate its light source 22 to light up the target vehicle $V_T$ upon detection of the alarm signal S emitted from the target vehicle $V_T$.

The distance and direction determination unit 23 comprises one or more sensors located in the determined point $P_D$ of the vehicle V. In the embodiment shown in FIG. 1C, the predetermined angular direction range $\alpha_{PD}$ and the predetermined distance range $D_{DP}$ are set as distance and direction threshold values where the vehicle V and the device X within its operational range efficiently can light up the target vehicle $V_T$. Depending on the configuration and design of the light sources, the light-up area 22 may be a three-dimensional light body having complex geometrical shapes in three dimensions, and the predetermined distance range $D_{DP}$ may vary depending on the angular direction $\alpha$ between the vehicle V and the target vehicle $V_T$, as well as the operational range of the device X. The predetermined angular direction ranges $\alpha_{PD}$ and the predetermined distance ranges $D_{DP}$ of the vehicle alarm system $S_{AL}$, are calibrated relative to each other for the light source 22 used in the vehicle V and the light source used in the device X. The vehicle alarm system $S_{AL}$ is determining the distance D and the angular direction $\alpha$ from the determined point $P_D$ in the vehicle V to a part of the target vehicle $V_T$ positioned closest to the vehicle V, as indicated with the arrow in FIG. 1C. The target vehicle $V_T$ is positioned outside possible ranges for the light-up area $A_L$ of the vehicle V, as shown in FIG. 1B, and the target vehicle $V_T$ cannot be lit up by the vehicle V. The vehicle V is therefore not activating the light source 22. The target vehicle $V_T$ is however positioned within possible ranges for the light-up area $A_L$ of the device X, as shown in FIG. 1C, and the target vehicle $V_T$ can instead be lit up by the device X. The device X may therefore activate the light source 22.

The vehicle alarm system $S_{AL}$ of the embodiment shown in FIG. 1C is only activating the light source 22 of the vehicle V and/or the light source 22 of the device X upon detection of the alarm signal S when the determined angular direction $\alpha$ is within the predetermined angular direction range $\alpha_{PD}$ and the determined distance D is within the predetermined distance range $D_{DP}$. It should be understood that it is possible for the vehicle alarm system $S_{AL}$ to activate the light sources 22 of both the vehicle V and the device X when the target vehicle $V_T$ is positioned within possible light-up areas $A_L$ of both the vehicle V and the device X. The vehicle alarm system $S_{AL}$ will not activate any of the light sources 22 of the vehicle V and the device X when the target vehicle $V_T$ is positioned outside possible light-up areas $A_L$ of both the vehicle V and the device X.

Figure 2:
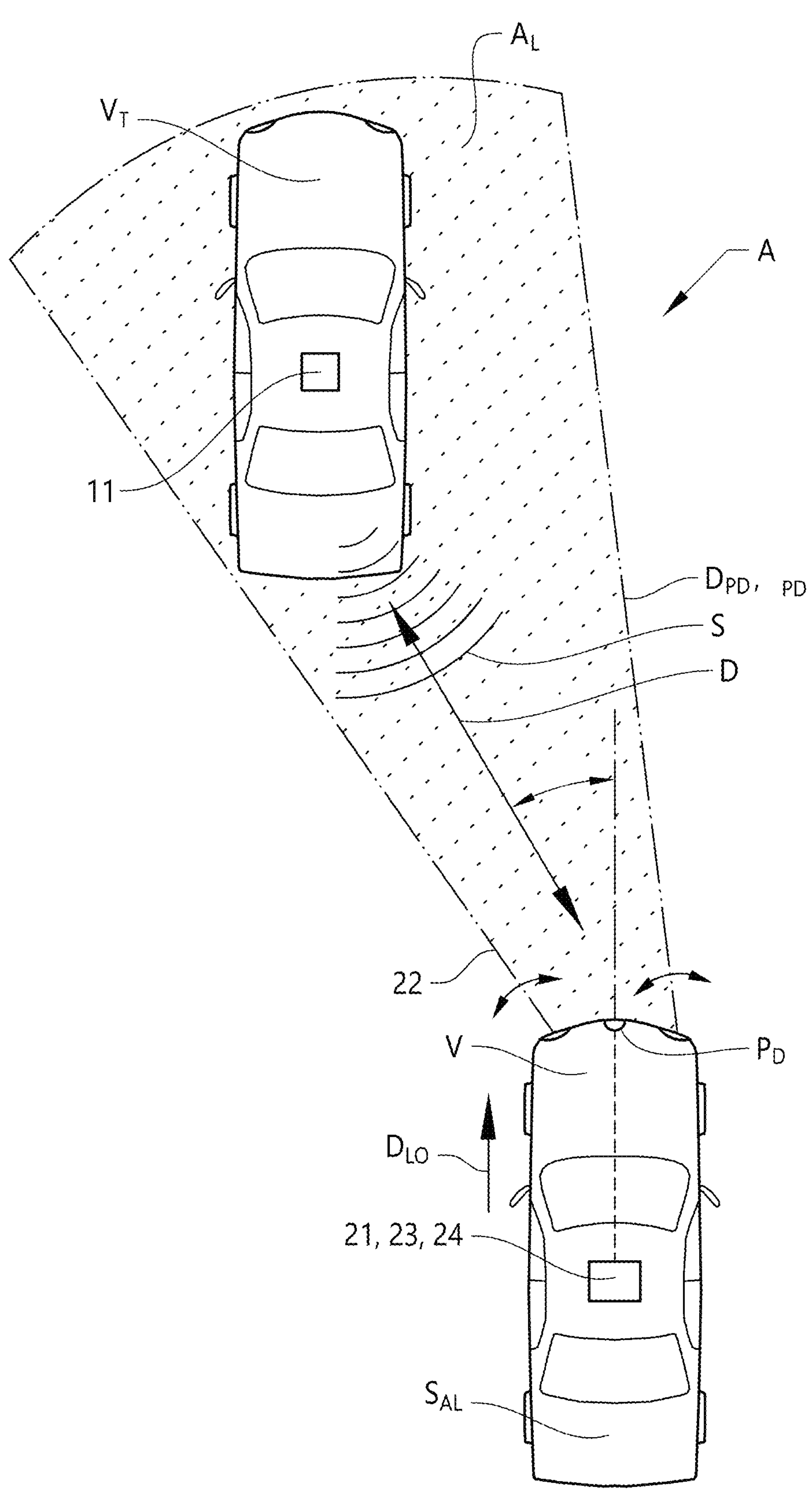
FIG. 2 shows schematically, in a view from above, the vehicle comprising a vehicle alarm system for lighting up a target vehicle, and a target vehicle.

In FIG. 2, an alternative embodiment of the vehicle alarm system $S_{AL}$ is schematically illustrated. A vehicle V and a target vehicle $V_T$ are parked in an area A. In this embodiment, the target vehicle $V_T$ is parked ahead of and in a direction to the left from the vehicle V. The target vehicle $V_T$ is parked at an angular direction $\alpha$ non-parallel to the longitudinal direction $D_{LO}$ of the vehicle V and the angular direction $\alpha$ is thus not the same as the longitudinal direction $D_{LO}$ of the vehicle V. In this embodiment, the vehicle V is equipped with a movably arranged light source 22 that may be directed in different positions. Suitable, the light source 22 is arranged as active or adaptive headlights. Such headlights may be configured for being adapted to changing roadway conditions, such as curves, to better help illuminating a roadway along a driving path. The active or adaptive headlights may also be connected to the vehicle alarm system $S_{AL}$ and used for changing direction of the light source 22. In this way, the light-up area $A_L$ may be considerably larger compared to traditional non-movably arrange headlights or the light source 22 may be directed towards the target vehicle $V_T$ for higher light intensity. With exception of the movably arranged light source 22, the alarm system $S_{AL}$ may as such be arranged and configured as described in the embodiments above. With this configuration of the light source 22, the vehicle alarm system $S_{AL}$ is actively directing the light source 22 of the vehicle V towards the target vehicle $V_T$ to light up the target vehicle $V_T$ upon receipt of the alarm signal S. In this exemplified operational situation, where the movably arranged light source 22 of the vehicle V is lighting up the target vehicle $V_T$, it is assumed that the determined angular direction $\alpha$ is within the predetermined angular direction range $\alpha_{PD}$ and the determined distance D is within the predetermined distance range $D_{DP}$.

In an alternative embodiment, the light source 22 is arranged at a device X associated with the vehicle V. The device X may be of a suitable configuration as described above. The light source 22 of the device X may be actively directed towards the target vehicle $V_T$ to light up the target vehicle $V_T$ upon receipt of the alarm signal S. The light source 22 of the device X may be movably arranged or the device X may per se change position for actively directing the light source. In this exemplified operational situation, where the light source 22 of the device X is lighting up the target vehicle $V_T$, it is assumed that the determined angular direction $\alpha$ is within the predetermined angular direction range $\alpha_{PD}$ and the determined distance D is within the predetermined distance range $D_{DP}$.

In other embodiments, the vehicle alarm system $S_{AL}$ may instead be arranged in two or more vehicles V. With such a system setup, the two or more vehicles V are configured for communicating with each other for activating at least one light source 22 of the two or more vehicles V to light up the target vehicle $V_T$ and/or activating at least one light source 22 of at least one device X associated the two or more vehicles V to light up the target vehicle $V_T$. In this way, the vehicle alarm system $S_{AL}$ is made more efficient by the involvement of more than one vehicle only. The vehicles V may be arranged to communicate with each other via suitable communication means, and each of the vehicles comprises alarm system components for an efficient system setup.

Figure 3:
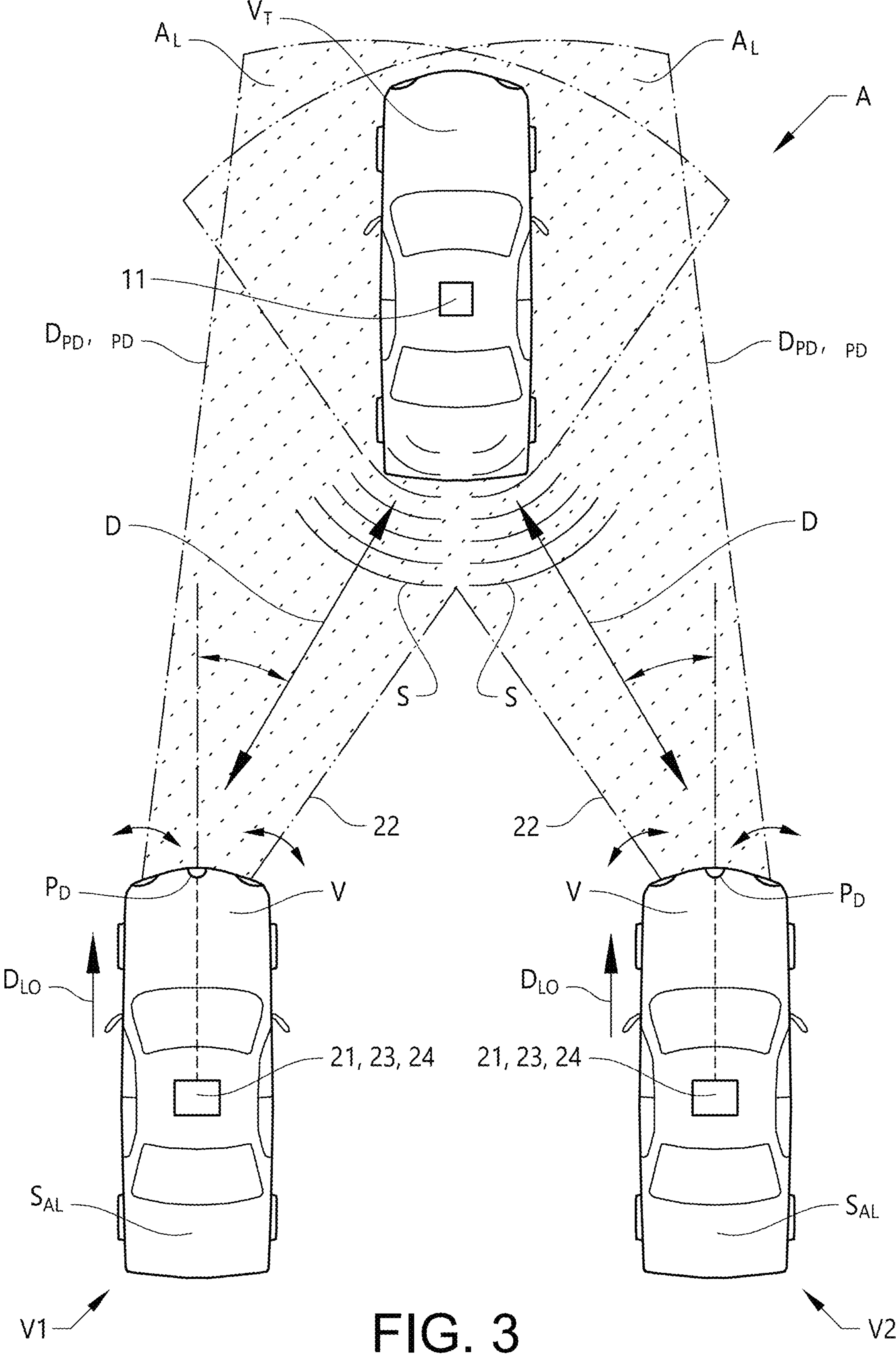
FIG. 3 shows schematically, in a view from above, two vehicles comprising a vehicle alarm system for lighting up a target vehicle, and a target vehicle.

In FIG. 3, a further alternative embodiment of the vehicle alarm system $S_{AL}$ is schematically illustrated. Two vehicles V and a target vehicle $V_T$ are parked in an area A. In this embodiment, the target vehicle $V_T$ is parked ahead of the two vehicles V. The target vehicle $V_T$ is parked ahead of a first vehicle V1 and in a direction to the right from the first vehicle V1. The target vehicle $V_T$ is parked ahead of a second vehicle V2 and in a direction to the left from the second vehicle V2. The target vehicle $V_T$ is parked at an angular direction $\alpha$ non-parallel to the longitudinal direction $D_{LO}$ of the first vehicle V1 and the second vehicle V2 respectively. In this embodiment, the first vehicle V1 and the second vehicle V2 are each equipped with a movably arranged light source 22 that may be directed in different positions, as described above in connection to FIG. 2 above. With exception of the movably arranged light sources 22, the alarm system $S_{AL}$ may for each of the two vehicles as such be arranged and configured as described in the embodiments above in connection to FIGS. 1A-1C. With this configuration of the light sources 22 of the first vehicle V1 and the second vehicle V2, the vehicle alarm system $S_{AL}$ may actively direct the light sources 22 of any of the two vehicles V towards the target vehicle $V_T$ to light up the target vehicle $V_T$ upon receipt of the alarm signal S. In order for the light source 22 of the first vehicle V1 to light up the target vehicle $V_T$, the determined angular direction $\alpha$ of the first vehicle V1 in relation to the target vehicle $V_T$ is within the predetermined angular direction range $\alpha_{PD}$ and the determined distance D between the first vehicle V1 and the target vehicle $V_T$ is within the predetermined distance range $D_{DP}$. In order for the light source 22 of the second vehicle V2 to light up the target vehicle $V_T$, the determined angular direction $\alpha$ of the second vehicle V2 in relation to the target vehicle $V_T$ is within the predetermined angular direction range $\alpha_{PD}$ and the determined distance D between the second vehicle V2 and the target vehicle $V_T$ is within the predetermined distance range $D_{DP}$. In one specific embodiment, the target vehicle may activate V2V communication asking for the location and direction of nearby vehicles, such as the first vehicle V1 and the second vehicle V2. If it is determined that the first vehicle V1 and the second vehicle V2 are within close proximity to the target vehicle $V_T$, V2V communication may be used between the first vehicle V1 and the second vehicle V2 to determine if one or both vehicles should light up the target vehicle $V_T$.

For the different embodiments, the vehicle alarm system $S_{AL}$ may further comprise a light determination unit 24 arranged in the vehicle V. The light determination unit 24 is configured for determining how the target vehicle $V_T$ is lit up by the light source 22. The light determination unit 24 may be determining the difference between light reflected by the target vehicle $V_T$ before and after activation of the light source 22, and the light determination unit 24 may be arranged as a camera unit in the vehicle V. Image detection and analysing software is suitably used for determining the difference in reflected light. When the vehicle V has activated the light source 22, the light determination unit 24 may use picture frame-to-frame comparison to compare if the light source 22 has significantly changed how the target vehicle $V_T$ is lit up by the light source 22. If the vehicle alarm system $S_{AL}$ is arranged in more than one vehicle V in the same area A, the light determination unit 24 can be used for controlling the number of light sources of different vehicles V that need to be activated, or determine if the target vehicle $V_T$ is positioned underneath a streetlight.

For the different embodiments, when the target vehicle $V_T$ is lit up by the light source 22, a camera in the vehicle V may be used for capturing still images or video sequences of the target vehicle $V_T$ and the intruder I. If being lit up by near infrared light, suitable night vison cameras may be used.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

REFERENCE SIGNS

11: Intruder alarm
21: Alarm signal detection unit
22: Light source
23: Distance and direction determination unit
24: Light determination unit
A: Parking area
$A_L$: Light-up area
$\alpha$: Angular direction
$\alpha_{PD}$: Predetermined angular direction range
D: Distance
$D_{DP}$: Predetermined distance range
I: Intruder
$P_D$: Determined point
S: Alarm signal
$S_{AL}$: Vehicle alarm system
V: Vehicle
$V_T$: Target vehicle
X: Device

What is claimed is:

1. A method for activating a vehicle alarm system arranged in a vehicle for lighting up a target vehicle, wherein the vehicle alarm system comprises an alarm signal detection unit, wherein the alarm signal detection unit is configured for detecting an alarm signal of the target vehicle, wherein the method comprises the steps:

detecting an alarm signal of the target vehicle by means of the alarm signal detection unit upon activation of an intruder alarm of the target vehicle;

determining an angular direction of the vehicle in relation to the target vehicle and a distance between the vehicle and the target vehicle, upon detection of the alarm signal;

activating a light source of the vehicle to light up the target vehicle and/or activating a light source of a device associated with the vehicle to light up the target vehicle, when the determined angular direction is within a predetermined angular direction range and the determined distance is within a predetermined distance range.

2. The method according to claim 1, wherein the alarm signal is a sound signal emitted by the target vehicle upon activation of the intruder alarm, wherein the method further comprises the step: detecting the emitted sound signal by means of the alarm signal detection unit.

3. The method according to claim 1, wherein the alarm signal is a light signal emitted by the target vehicle upon activation of the intruder alarm, wherein the method further comprises the step: detecting the emitted light signal by means of the alarm signal detection unit.

4. The method according to claim 1, wherein the alarm signal is a V2V communication signal emitted by the target vehicle upon activation of the intruder alarm, wherein the method further comprises the step: detecting the emitted V2V communication signal by means of the alarm signal detection unit.

5. The method according to claim 1, wherein the method further comprises the step: actively directing the light source of the vehicle towards the target vehicle and/or actively directing the light source of the device to light up the target vehicle.

6. The method according to claim 1, wherein the vehicle alarm system ($S_{AL}$) further comprises a distance and direction determination unit arranged in the vehicle, wherein the method further comprises the step: determining the angular direction and the distance to the target vehicle by means of the distance and direction determination unit.

7. The method according to claim 1, wherein the vehicle alarm system further comprises a light determination unit arranged in the vehicle, wherein the light determination unit is configured for determining how the target vehicle is lit up by the light source, wherein the method further comprises the step: determining the difference between light reflected by the target vehicle before and after activation of the light source by means of the light determination unit.

8. A vehicle alarm system arranged in a vehicle for lighting up a target vehicle, wherein the vehicle alarm system comprises an alarm signal detection unit, wherein upon activation of an intruder alarm of the target vehicle the alarm signal detection unit is configured for detecting an alarm signal of the target vehicle, wherein the vehicle alarm system is configured for determining an angular direction of the vehicle in relation to the target vehicle and a distance between the vehicle and the target vehicle upon detection of the alarm signal, wherein when the determined angular direction is within a predetermined angular direction range and the determined distance is within a predetermined distance range, the vehicle is configured for activating a light source to light up the target vehicle and/or the vehicle is configured for activating a light source of a device associated with the vehicle to light up the target vehicle.

9. The vehicle alarm system according to claim 8, wherein the alarm signal is a sound signal emitted by the target vehicle upon activation of the intruder alarm, wherein the alarm signal detection unit is configured for detecting the emitted sound signal.

10. The vehicle alarm system according to claim 8, wherein the alarm signal is a light signal emitted by the target vehicle upon activation of the intruder alarm, wherein the alarm signal detection unit is configured for detecting the emitted light signal.

11. The vehicle alarm system according to claim 8, wherein the alarm signal is a V2V communication signal emitted by the target vehicle upon activation of the intruder alarm, wherein the alarm signal detection unit is configured for detecting the emitted V2V communication signal.

12. The vehicle alarm system according to claim 8, wherein the vehicle alarm system is configured for actively directing the light source of the vehicle and/or the light source of the device towards the target vehicle upon receipt of the alarm signal.

13. The vehicle alarm system according to claim 8, wherein the light source is a headlight of the vehicle, and/or wherein the light source is a light unit of the device associated with the vehicle.

14. The vehicle alarm system according to claim 8, wherein the vehicle alarm system further comprises a distance and direction determination unit arranged in the vehicle, wherein the distance and direction determination unit is configured for determining the angular direction and the distance to the target vehicle.

15. The vehicle alarm system according to claim 8, wherein the vehicle alarm system further comprises a light determination unit arranged in the vehicle, wherein the light determination unit is configured for determining how the target vehicle is lit up by the light source, wherein the light determination unit is configured for determining the difference between light reflected by the target vehicle before and after activation of the light source.

16. The vehicle alarm system according to claim 14, wherein the distance and direction determination unit is arranged as a camera unit, a microphone unit, and/or a V2V unit in the vehicle; and/or wherein the light determination unit is arranged as a camera unit in the vehicle.

17. The vehicle alarm system according to claim 8, wherein the vehicle alarm system is arranged in two or more vehicles, wherein the two or more vehicles are configured for communicating with each other for activating at least one light source of the two or more vehicles to light up the target vehicle and/or activating at least one light source of at least one device associated the two or more vehicles to light up the target vehicle.

18. A vehicle comprising the vehicle alarm system according to claim 7.

* * * * *